United States Patent
Hahn et al.

[11] Patent Number: 6,010,178
[45] Date of Patent: *Jan. 4, 2000

[54] COVERING ARRANGEMENT FOR A FOLDING-TOP COMPARTMENT WHICH IS ARRANGED IN THE REAR REGION OF A VEHICLE

[75] Inventors: Gerald Hahn, Hamburg; Astrid Harting, Sindelfingen; Andreas Hasselgruber, Reinbek; Juergen Schrader, Weil im Schoenbuch; Eckart Schuler, Sindelfingen, all of Germany

[73] Assignee: DaimlerChrysler AG, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/834,929

[22] Filed: Apr. 7, 1997

[30] Foreign Application Priority Data

Apr. 6, 1996 [DE] Germany ............ 196 13 917

[51] Int. Cl.$^7$ ............................................. B60J 7/00
[52] U.S. Cl. ...................... 296/107.08; 296/136
[58] Field of Search ................ 296/136, 107.08, 296/107.16, 107.17, 108, 37.16

[56] References Cited

U.S. PATENT DOCUMENTS

| | | | |
|---|---|---|---|
| 3,338,624 | 8/1967 | Champton | 296/136 |
| 4,895,409 | 1/1990 | Konishi et al. | 296/107.17 |
| 5,209,544 | 5/1993 | Benedetto et al. | 296/136 |
| 5,295,722 | 3/1994 | Bonne et al. | 296/107.08 |
| 5,542,735 | 8/1996 | Furst et al. | 296/107 |
| 5,551,743 | 9/1996 | Klein et al. | 296/136 |
| 5,654,615 | 8/1997 | Brodsky | 296/107.08 |
| 5,746,470 | 5/1998 | Seel et al. | 296/108 |
| 5,769,483 | 6/1998 | Danzl et al. | 296/108 |
| 5,785,375 | 7/1998 | Alexander et al. | 296/108 |

FOREIGN PATENT DOCUMENTS

| | | |
|---|---|---|
| 44 45 941 | of 0000 | Germany . |
| 44 46 483 | 6/1996 | Germany . |
| 4-34093 | 8/1992 | Japan . |
| 6-51448 | 7/1994 | Japan . |

Primary Examiner—D. Glenn Dayoan
Assistant Examiner—Kiran Patel
Attorney, Agent, or Firm—Evenson, McKeown, Edwards & Lenahan, P.L.L.C.

[57] ABSTRACT

A covering arrangement for a folding-top compartment which is arranged in the rear region of a vehicle and into which it is possible to pivot a folding top which has a solid, bottom rear-wall termination, and having a folding-top cover by way of which it is possible to cover the frame opening behind the rear-wall termination of the closed folding top. The covering arrangement includes a panel covering by way of which it is possible to cover most of the frame opening of the folding-top compartment in front of the rear-wall termination of the closed folding top, and having the capability for the panel covering to be displaced. This capability makes it possible for at least a rear panel of the panel covering to be moved forward into an out-of-the-way position, such that the folding top can be pivoted past it. Once the folding top has been stowed away, the rear panel can be moved rearward into a position in which the rear panel adjoins the front border side of the folding-top-compartment cover. A front panel of the panel covering has a cross-sectional length which is adapted to the path along which the rear panel is displaced between its two covering positions. The front panel can be transferred out of its covering position into a not-in-use position, and the rear panel can be displaced forward to serve as a correspondingly shortened panel covering.

16 Claims, 7 Drawing Sheets

COVERING ARRANGEMENT FOR A FOLDING-TOP COMPARTMENT WHICH IS ARRANGED IN THE REAR REGION OF A VEHICLE

BACKGROUND AND SUMMARY OF THE INVENTION

The invention relates to a covering arrangement for a folding-top compartment which is arranged in the rear region of a vehicle.

This application claims the priority of German Patent Document No. 196 13 917.1 filed in Germany on Apr. 6, 1996 the disclosure of which is expressly incorporated by reference herein.

A covering arrangement of the type generally described above is disclosed in German Patent Application P 44 46 483.5, which was not published before the priority date. In this case, the panel covering comprises three elongate panels which extend in the width direction of the vehicle, the panels being arranged one behind the other in their covering position and together covering over the front region of the frame opening of the folding-top compartment. Since the rear side of the panel covering is curved in a manner corresponding to the rear-wall termination of the folding top, it can be used as a parcel shelf once the folding cover has been closed. In order that, once the folding cover has been lowered, the panel covering is suitable, not only as a parcel shelf, but also for covering the front region of the frame opening as far as the front border side of the closed folding-top-compartment cover, the panel covering is arranged such that it can be displaced in the longitudinal direction of the vehicle, and it is adapted to the larger frame-opening length which is to be covered. Once the folding cover has been closed, the panel covering is displaced forward, in which case its front region covers over a bodywork crossmember which bounds the folding-top compartment at the front. For this purpose, there has to be a displacement clearance for the panel covering above the crossmember. This considerably restricts the freedom for designing the crossmember. For example, it is no longer readily possible to provide the crossmember on its upper side with a rigid panel which projects beyond the covering plane of the panel covering.

An object of the invention is to further develop a covering arrangement of the type generally described above to the extent that it is possible to avoid adversely affecting the freedom for designing the crossmember at the front of the frame opening of the folding-top compartment.

This and other objects have been achieved according to the present invention by providing a covering arrangement for a folding-top compartment which is arranged in a rear region of a vehicle to receive a pivotable folding top having a solid, bottom rear-wall termination, a pivotable folding-top-compartment cover covering a frame opening behind the rear-wall termination of the closed folding top, comprising: a displaceable panel covering which covers at least a portion of the frame opening of the folding-top compartment in front of the rear-wall termination of the closed folding top, the panel covering including at least a rear panel and a front panel, the rear panel being displaceable forward into an out-of-the-way position such that the folding top can be pivoted through the frame opening into a storage position, and the rear panel being movable rearward after the folding top is in the storage position into a covering position in which the rear panel adjoins a front border side of the folding-top-compartment cover, the front and rear panels being movable relative to each other, the front panel having a cross-sectional length which is adapted to a path along which the rear panel is displaced between the out-of-the-way position and the covering position, the front panel being displaceable between a covering position and a not-in-use position, whereupon the rear panel is displaced forward and serves as a correspondingly shortened panel covering.

This and other objects have also been achieved according to the present invention by providing a covering arrangement for a folding-top compartment of a cabriolet, comprising: a rear folding-top roof part mounted pivotably about a main spindle of a lateral bearing bracket; a front folding-top roof part rotatably coupled to the rear folding-top roof part; a main link having a first end rotatably coupled to the front folding-top roof part and having a second end rotatably coupled to a first arm of a two-armed guide lever, the two-armed guide lever being mounted rotatably as a rocker about a fixed spindle; a first end of a connecting rod being rotatably coupled to a second arm of the two-armed guide lever, a second end of the connecting rod being rotatably coupled to a bottom lever arm of the rear folding-top roof part; and a front panel and a rear panel, the rear panel being coupled to a first carrying plate, the first carrying plate including a lever arm which is rotatably coupled to a first end of an intermediate lever, the intermediate lever being mounted rotatably as a rocker about a stationary hinge joint, a second end of the intermediate lever being rotatably coupled to the first end of a link, the second end of the link being coupled to the two-armed guide lever at a distance from the fixed spindle and between the first and second arms, the front panel being coupled to a second carrying plate, the second carrying plate including a lever arm which is rotatably coupled to the first carrying plate via a hinge joint.

By virtue of the covering arrangement according to the invention, it is no longer necessary to have a displacement clearance for the variable panel covering above the crossmember. Since the front panel is not required for covering tasks once the folding top has been closed, it may, in the simplest case, be designed to be removable, as a result of which it can be stowed completely separately.

In order to be able to displace the front panel quickly and without difficulty between its use position and its not-in-use position, the panel can be swung down into the folding-top compartment and swung out thereof.

In order that the rear panel can only be displaced forward once the front panel has already been swung down, provision is made for the front panel to be articulated on the rear panel.

The movement of the panels of the panel covering is preferably controlled via bar-type mechanisms, which are arranged on either side of the panel covering and are of mirror-inverted construction, in order to ensure the desired sequence of movements. The lateral fittings of the panels may also be used as bar elements here.

Advantageously, the bar-type mechanisms comprise exclusively rotary joints, thus permitting a low-maintenance and low-noise configuration of the mechanisms.

In order for it not to be necessary to provide any additional drive for the panel covering, bar-type mechanisms are preferably coupled in terms of movement to the folding-top framework.

Other objects, advantages and novel features of the present invention will become apparent from the following detailed description of the invention when considered in conjunction with the accompanying drawings which illustrate preferred embodiments of the invention.

DETAILED DESCRIPTION OF THE DRAWINGS

Figure 1:
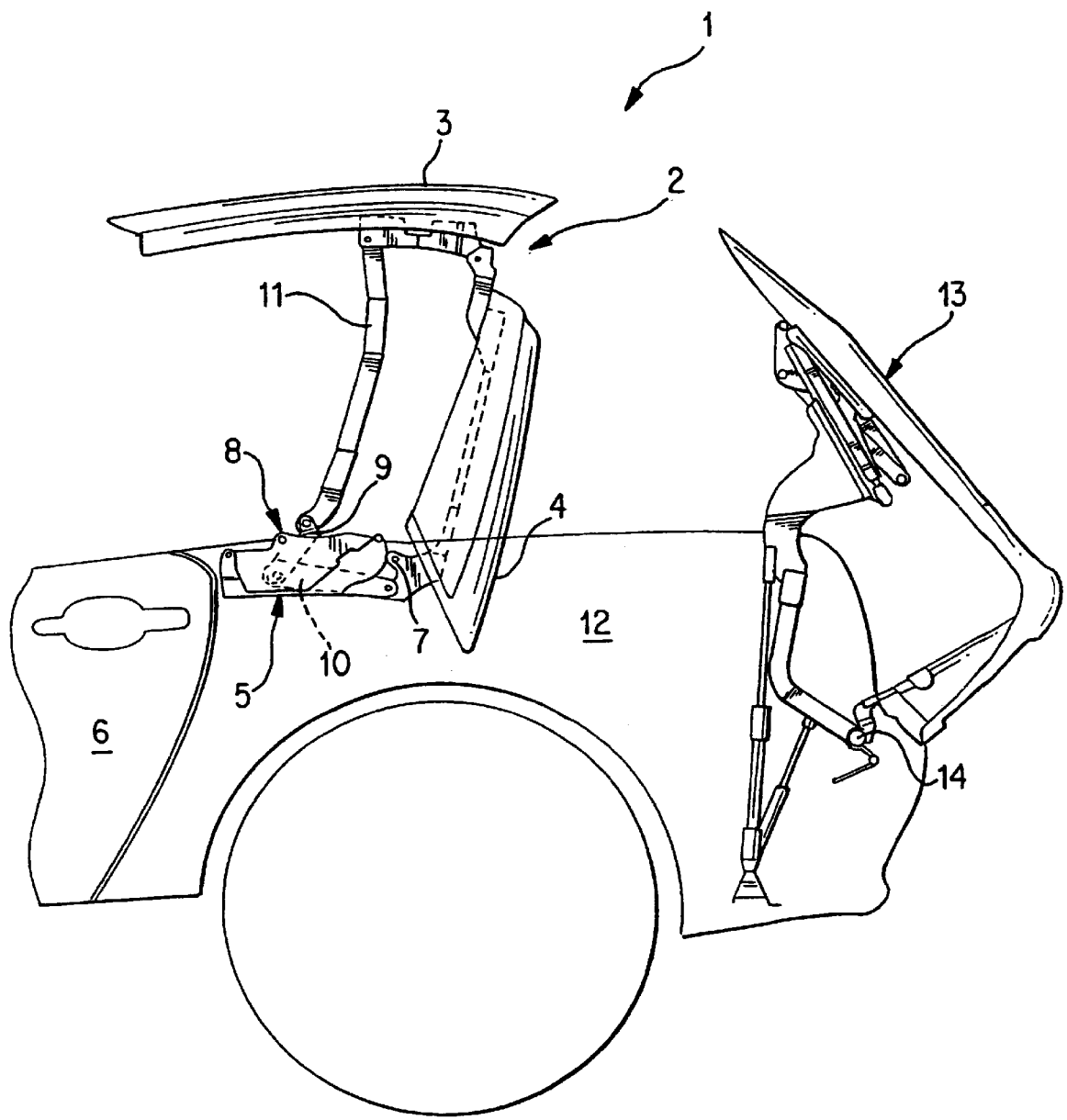
FIG. 1 shows a schematic side view of the rear region of a cabriolet as the folding top is being folded back into its folding-top compartment.

A cabriolet 1 is provided with a folding top 2 which can be completely lowered, is designed as a hard top and has a front roof part 3 and a rear roof part 4. The rear roof part 4, which comprises the rear window and lateral roof pillars, is mounted pivotably on lateral bearing brackets 5, which are arranged in a sunken manner, on either side behind the side doors 6, in the rear side wall of the cabriolet 1. The rear roof part 4 is thus mounted such that it can be pivoted around a main spindle 7, the geometrical axis of which extends horizontally in the width direction of the vehicle. The lateral bearing brackets 5 and the framework members articulated thereon are of mirror-symmetrical design with respect to the longitudinal center plane of the vehicle, so that, for reasons of simplicity, they are only shown on one side.

Arranged at a distance in front of the main spindle 7, in the bearing bracket 5, is a further spindle 8, on which a two-armed guide lever 9 is mounted in the manner of a rocker. The bottom end of said guide lever 9 is coupled in terms of movement, by a connecting rod 10, to a bottom lever arm of the roof part 4, said bottom lever arm projecting with respect to the main spindle 7. The bottom end of a main link 11 is connected in an articulated manner at the top end of the guide lever 9. The top end of the main link 11 and a lever arm of the roof part 4 are articulated on the front roof part 3 at a distance apart from one another which corresponds to the distance between the main spindle 7 and the spindle 8. The movement of the front roof part is thus controlled by lateral parallelogram linkages.

In order to open the closed folding top 2, it is necessary to release a locking means (not shown) which locks the front roof part 3 to the frame of the windscreen and to open a folding-top compartment 12, which is arranged in a sunken manner in the rear of the cabriolet 1. For this purpose, a folding-top-compartment cover 13, which is designed as a rear cover and extends as far as the termination at the rear of the cabriolet 1, can be swung up in the rearward direction around a transverse spindle 14 of the vehicle, said spindle running in the vicinity of the rear bumper, until said cover reaches its depicted open position.

The folding top 2 can then be swung, by means of a pivot drive of the rear roof part 4, e.g. by means of hydraulic working cylinders (not shown), into the folding-top compartment 12 until it has been completely lowered and stowed away therein. Thereafter, the folding-top-compartment cover 13 is swung down into its closed position again and completely covers over the frame opening of the folding-top compartment 12 in the rear region. However, the frame opening of the folding-top compartment 12 extends further forward, this providing the necessary pivoting space for the folding top 2.

Figure 2:
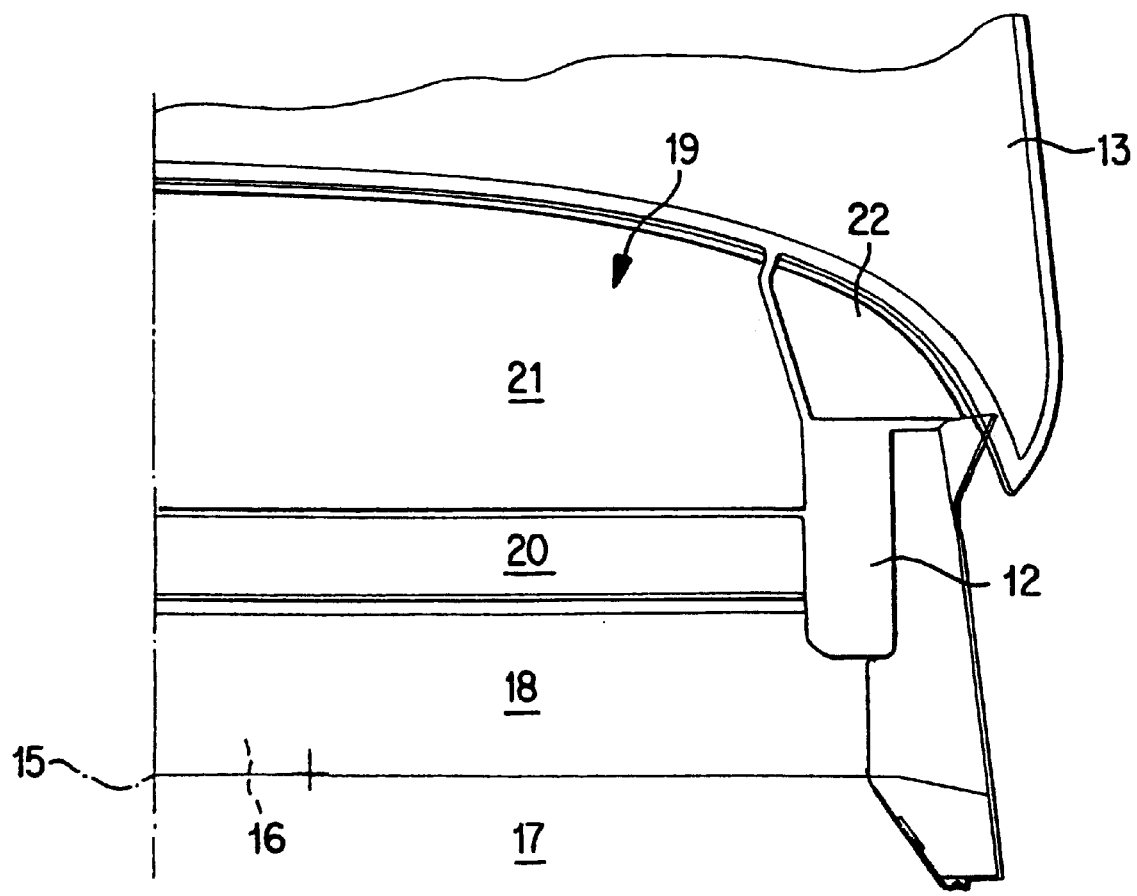
FIG. 2 shows a plan view of a covering arrangement of the folding-top compartment once the folding top has been lowered.

FIG. 2 shows half of the covering arrangement, which is mirror-symmetrical with respect to the central longitudinal axis 15 of the cabriolet 1, in the front region of the folding-top compartment 12. The folding-top compartment 12 is bounded at the front by a crossmember 16 of the bodywork, a dimensionally rigid panel 18 covering said crossmember on its upper side and on its front side, which is directed towards the rear region 17 of the passenger compartment.

The frame opening of the folding-top compartment 12 is thus bounded at the front by the rear edge of the panel 18, which extends in a rectilinear manner in the width direction of the cabriolet 1. In front of the front border side of the folding-top-compartment cover 13, this front border side being curved in an arcuate manner corresponding to the rear, bottom roof termination of the roof part 4, and behind the panel 18, the frame opening of the folding-top compartment 12 is largely covered over by a panel covering 19, which has a front panel 20, a rear panel 21 and side flaps 22 arranged laterally beside the rear panel 21. The rear border sides of the rear panel 21 and of the side flaps 22, these running in a curved manner essentially parallel to the front border side of the folding-top-compartment cover 13, are covered over by the folding-top-compartment cover 13 to the extent of a few millimeters. In contrast, the front border side of the rear panel 21 is rectilinear and thus runs parallel to the rear edge of the panel 18. The front panel 20 is in the form of a bar with mutually parallel sides and covers over the frame opening between the rear panel 21 and panel 18. In order, during closure of the folding top 2, to provide the movement clearance for lateral bars of the folding top 2, the panels 20 and 21 terminate at a corresponding distance from the side wall of the folding-top compartment 12.

Figure 3:
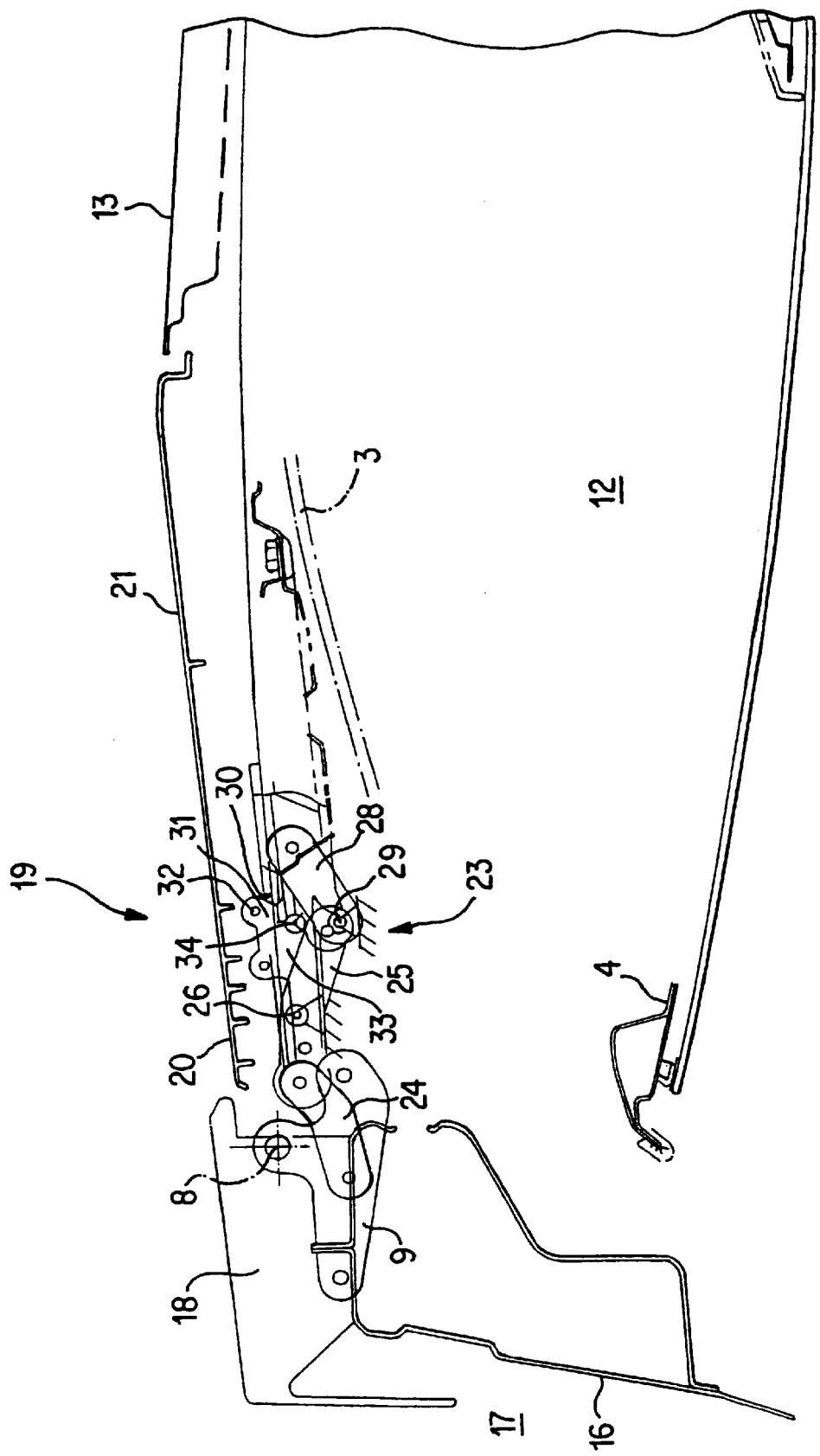
FIG. 3 shows a section through the covering arrangement according to FIG. 2.

As can be seen in the sectional illustration according to FIG. 3, the frame opening of the folding-top compartment 12 is covered over by the slightly forwardly inclined panel covering 19 once the folding top 2 has been lowered, the panels 20 and 21 and the folding-top-compartment cover 13 adjoining one another with their surfaces essentially flush. For this purpose, the rear border side of the rear panel 21, said rear border side being covered over by the folding-top-compartment cover 13, is angled in an approximately L-shaped manner. Since the upper side of the panel 18 is located at a slightly higher level than the plane of the upper side of the panel covering 19, there is a stepped offset between the panel 18 and the panel 20 located behind it.

Figure 4:
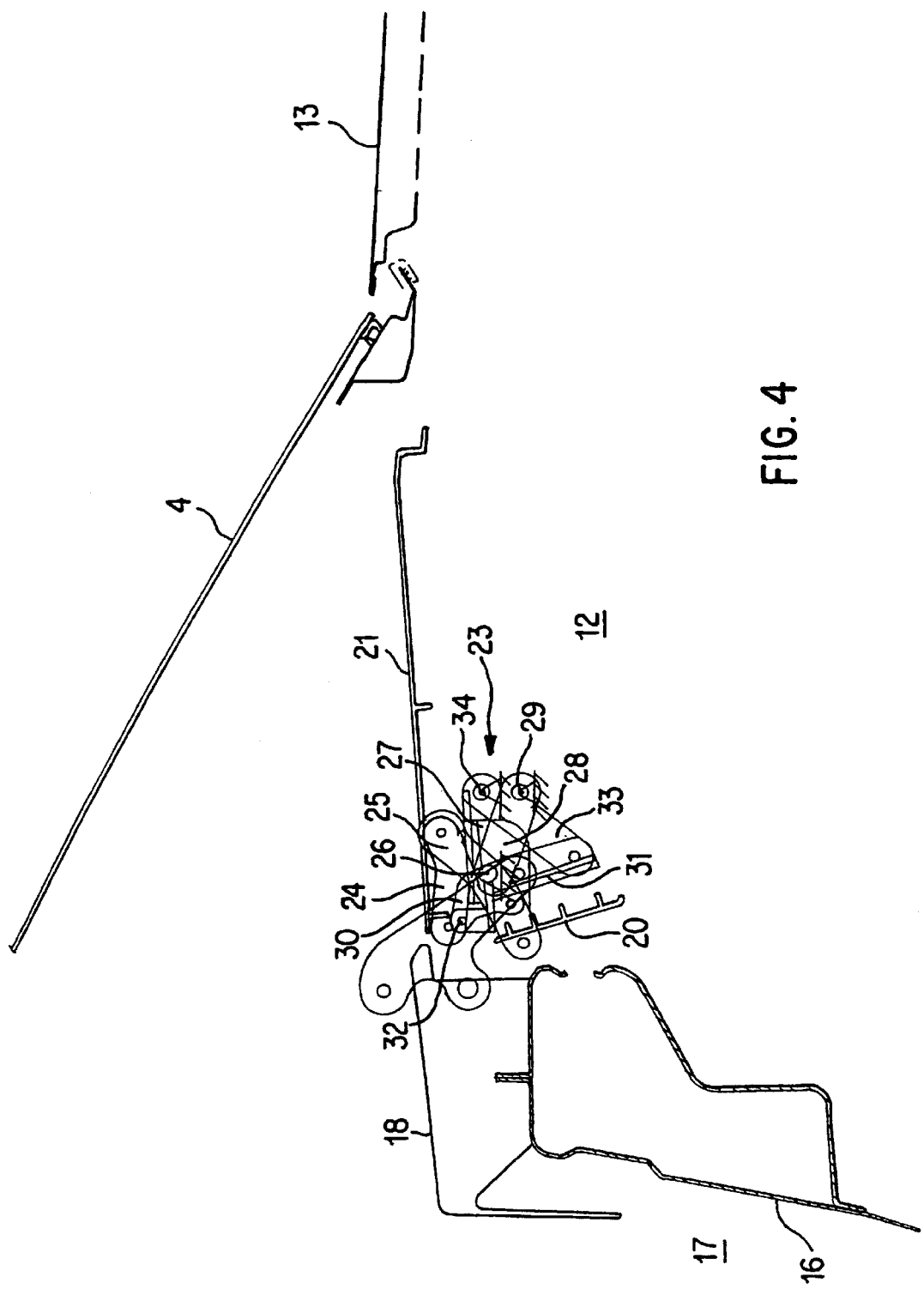
FIG. 4 shows a section through the covering arrangement once the folding top has been closed.

In order to be able to use the rear panel 21 as a parcel shelf once the folding top 2 has been closed, as can be seen in FIG. 4, the front panel 20 is swung out of its approximately horizontal, covering position in front of the rear panel 21 into the folding-top compartment 12, and the rear panel 21 is slid forward, whereupon, corresponding to the front panel 20 in its covering position, said rear panel adjoins the rear edge of the panel 18. Displacing the rear panel 21 forward produces a gap between the rear, bent border side of the rear panel 21 and the front border side, bent parallel thereto, of the folding-top-compartment cover 13, said gap being covered over by a bracket profile which forms the rear, bottom termination of the roof part 4. It goes without saying that, for this purpose, the cross-sectional length of the front panel 20 has to correspond largely to the displacement path over which the rear panel 21 is displaced forward. In addition, the width of the rear panel 21 must be adapted approximately to the width of the front panel 20. Once the rear panel 21 has been displaced forward, the side flaps 22 are swung up and thus release the space for the roof pillars of the rear roof part 4.

Figure 5:
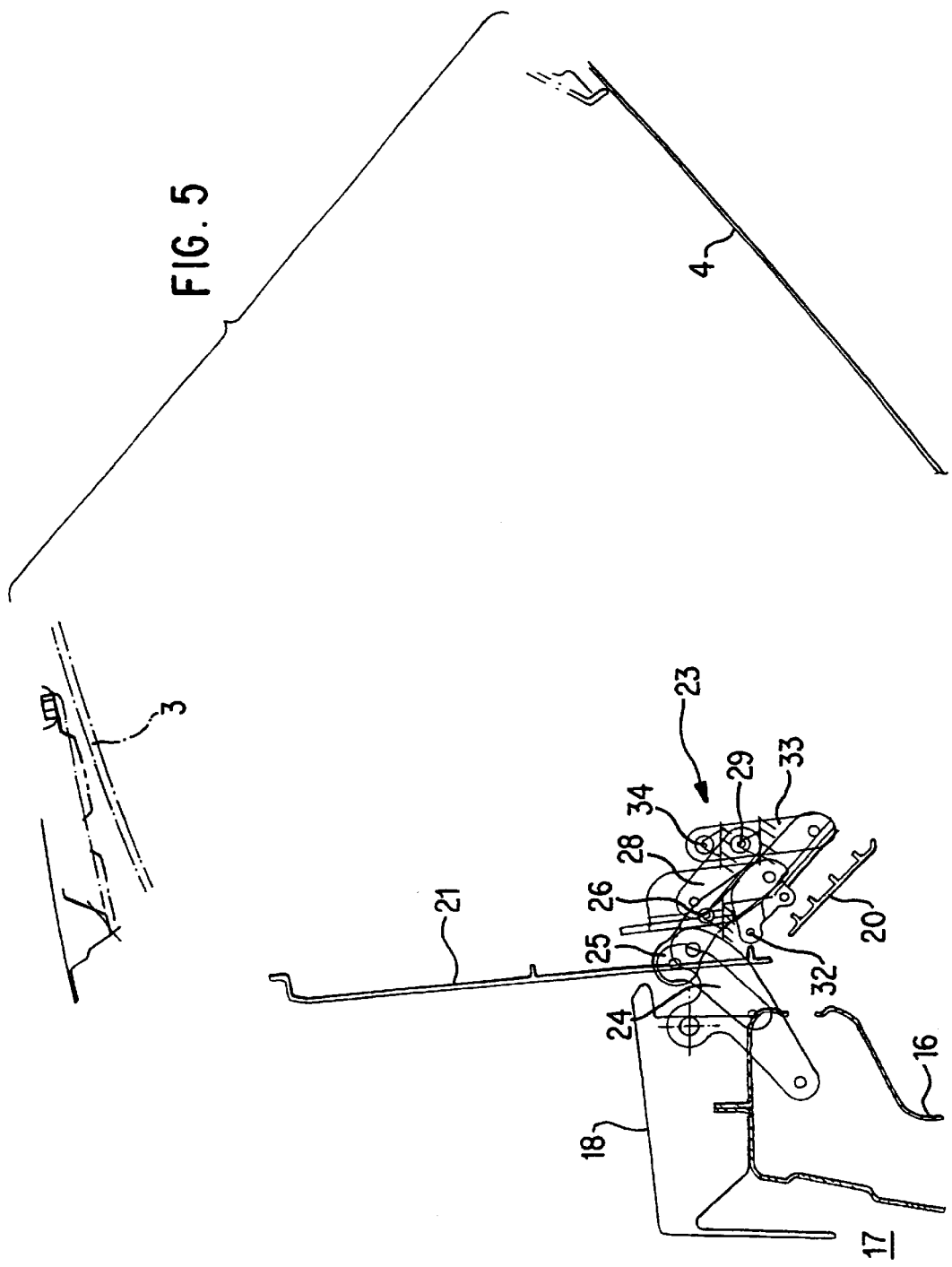
FIG. 5 shows a section through the covering arrangement during opening and/or closure of the folding top.

In order that the opening and closing operations of the folding top 2 are not obstructed by the panel covering 19, the front panel 20 moves out of the way in each case into its not-in-use position in the folding-top compartment 12 and the rear panel 21 is displaced forward into an out-of-the-way position, in which it is retained, in an approximately vertically aligned manner, close behind the panel 18 and has part of its cross-sectional length lowered into the folding-top compartment 12, as can be seen in FIG. 5.

In order to control the movements of the panel-covering parts between the two covering positions of the panel covering 19 and this out-of-the-way position, the panels 20 and 21 are guided by bar-type mechanisms 23 arranged at the lateral ends of said panels. The bar-type mechanisms 23 have exclusively rotary joints with mutually parallel geometrical axes which extend approximately horizontally in the width direction of the cabriolet 1. Consequently, the elements of the mechanisms move, in planes parallel to the longitudinal center plane of the cabriolet 1, laterally beside the associated bearing bracket 5 on their side of the vehicle.

Figure 6:
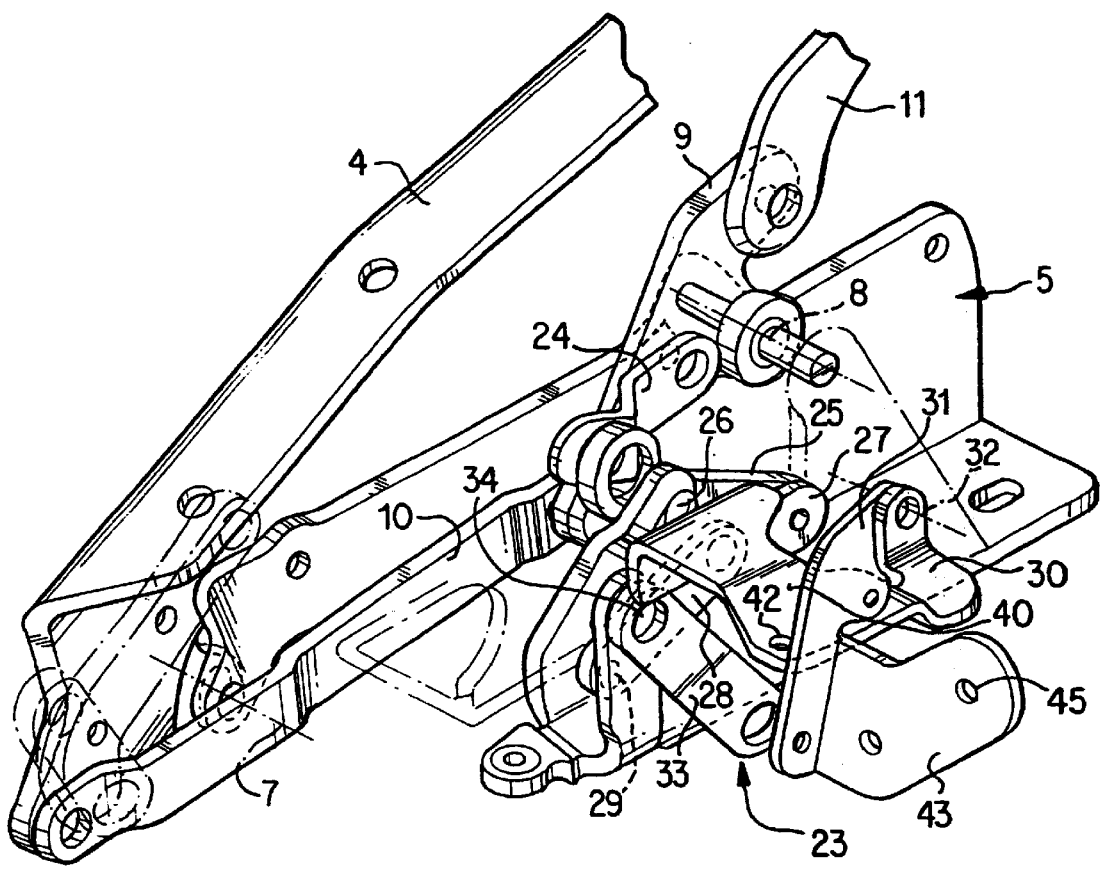
FIG. 6 shows a perspective close-up view in the area of the bar-type linkage of the covering arrangement on one side of the vehicle.

In order that the panel covering 19 is also driven, at the same time, via the (hydraulic) drive of the folding top 2, the bar-type mechanisms 23 are coupled in terms of movement to the adjacent bar-type mechanism via a link 24, as can clearly be seen, in particular, in FIG. 6. The link 24 is articulated, by means of its front end, on the guide lever 9 beneath the spindle 14 and, once the folding top 2 has been closed, extends approximately horizontally in the rearward direction. The rear end of the link 24 is connected in an articulated manner to the rear end of a two-armed intermediate lever 25, which extends obliquely downwards in the forward direction and is mounted intermediately, in its center region, on the bearing bracket 5 in the manner of a rocker via a stationary hinge joint 26.

Figure 7:
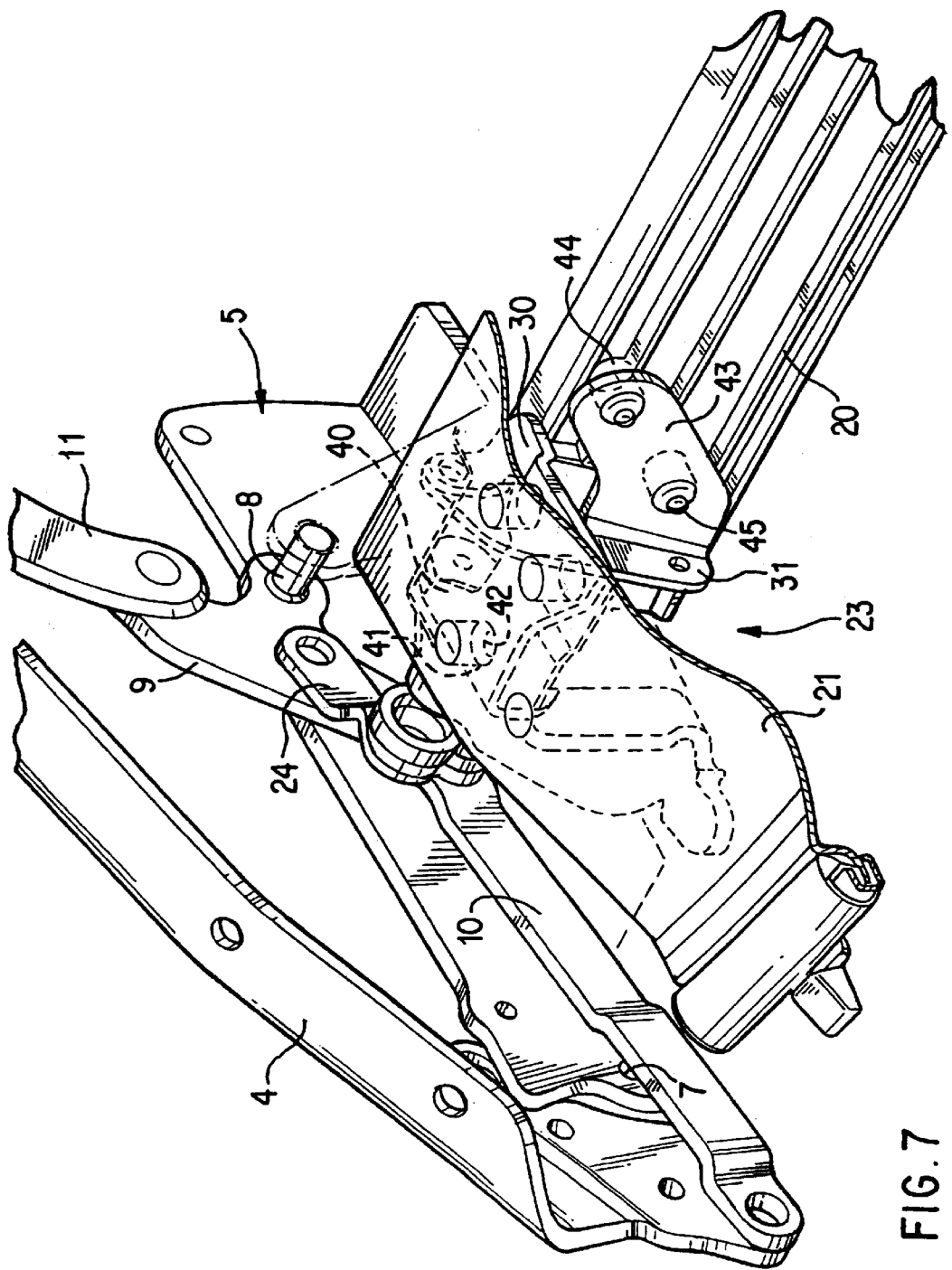
FIG. 7 shows a perspective close-up view in the area of the bar-type linkage of FIG. 6 showing the attachment of the front and rear panels.

The intermediate lever 25 is supported in an articulated manner, by means of its front end, on a lever arm 27, the lever arm 27 comprising a bent side wall of a carrying plate 40 on which the rear panel 21 can be placed and fastened via a lateral end region. As shown in FIG. 7, the lateral end region of the rear panel 21 includes three cylindrical bushings 41 which are aligned with corresponding holes 42 in the carrying plate 40. Threaded connectors, such as a screws or bolts are placed through the cylindrical bushings 41 and the holes 42 to connect the rear panel 21 to the carrying plate 40. In addition, a supporting lever 28 retains the lever arm 27 in its approximately horizontal position, in which the rear panel 21 is in the covering position in which it can be used as a parcel shelf. In this arrangement, the supporting lever 28 extends, from its point of articulation on the lever arm 27, obliquely downward in the rearward direction as far as a bearing block of the associated bearing bracket 5, on which it is mounted by a stationary hinge joint 29.

Laterally beside the lever arm 27, the carrying plate 40 includes a further angled lever arm 30, the top end of which is connected in an articulated manner to a lever arm 31. This lever arm 31 is formed by an angled side leg of a further carrying plate 43 which is fastened to the front panel 20. As shown in FIG. 7, the lateral end region of the front panel 20 includes three cylindrical bushings 44 which are aligned with corresponding holes 45 in the carrying plate 43. Threaded connectors, such as a screws or bolts are placed through the cylindrical bushings 44 and the holes 45 to connect the front panel 20 to the carrying plate 43. The front panel 20 is connected pivotably to the rear panel 21 via hinge joints 32, the geometrical pivot axis of the hinge joints 32 running in the vicinity of the front border side of the rear panel 21. Articulated at the bottom end of the lever arm 31 of the carrying plate 43 is a bottom end of a further supporting lever 33, which extends obliquely upwards in the rearward direction once the folding top 2 has been closed. At its top end, the supporting lever 33 is mounted, via a hinge joint 34, on an associated bearing block of the bearing bracket 5 and can thus be pivoted around a stationary axis.

The bar-type mechanisms 23 kinematically link the front and rear panels 20, 21 with the folding top linkage 7, 8, 9, 10, 11, such that the panels are automatically moved to the respective positions shown in FIGS. 3–7 as the folding top is opened and closed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Covering arrangement for a folding-top compartment which is located behind a rigid panel of a vehicle to receive a pivotable folding top having a solid, bottom rear-wall termination, a pivotable folding-top-compartment cover covering a frame opening behind the rear-wall termination of the closed folding top, comprising:

a displaceable panel covering which covers at least a portion of the frame opening of the folding-top compartment in front of the rear-wall termination of the closed folding top and behind a rear edge of the rigid panel, said panel covering including at least a rear panel and a front panel, said rear panel being displaceable forward into an out-of-the-way position such that the folding top can be pivoted through said frame opening into a storage position, and said rear panel being movable rearward after said folding top is in said storage position into a covering position in which a rear edge of said rear panel is adjacent to a front border side of the folding-top-compartment cover and a front edge of said front panel is adjacent to said rigid panel, said front and rear panels being movable relative to each other, said front panel having a cross-sectional length which is adapted to a path along which the rear panel is displaced between said out-of-the-way position and said covering position, the front panel being displaceable between a covering position and a not-in-use position, whereupon the rear panel is displaced forward such that a front edge of the rear panel is adjacent to said rigid panel and serves as a correspondingly shortened panel covering.

2. Covering arrangement according to claim 1, wherein the front panel of the panel covering can be swung out of an approximately horizontal, covering position in front of the rear panel, beneath the covering level of the panel covering, into the folding-top compartment.

3. Covering arrangement according to claim 2, wherein the front panel is connected, along its rear border side, to the front border side of the rear panel via a hinge joint.

4. Covering arrangement according to claim 3, wherein the movement of the panel covering between the two covering positions and its out-of-the-way position is controlled via bar-type mechanisms arranged on lateral sides of the panel covering.

5. Covering arrangement according to claim 4, wherein the bar-type mechanisms have exclusively rotary joints.

6. Covering arrangement according to claim 4, wherein the bar-type mechanisms are arranged in the vicinity of the lateral main bearings of the folding top and are operatively movably coupled to an associated framework member of the folding top.

7. Covering arrangement according to claim 6, wherein a link connects the bar-type mechanisms to a two-armed guide lever of the associated main link.

8. Covering arrangement according to claim 1, wherein:

said front and rear panels cover said folding-top compartment in a substantially horizontal position when the folding top is in said storage position;

said rear panel is moved forward into a substantially vertical position proximate said rigid panel and said front panel moves downward into said folding-top compartment when said folding top is moved between said storage position and said covering position; and said rear panel covers said folding-top compartment in a substantially horizontal position with said front panel remaining in said folding-top compartment when said folding top is in said covering position.

9. Covering arrangement for a folding-top compartment of a cabriolet, comprising:

a rear folding-top roof part mounted pivotably about a main spindle of a lateral bearing bracket;

a front folding-top roof part rotatably coupled to the rear folding-top roof part;

a main link having a first end rotatably coupled to the front folding-top roof part and having a second end rotatably coupled to a first arm of a two-armed guide lever, said two-armed guide lever being mounted rotatably as a rocker about a fixed spindle;

a first end of a connecting rod being rotatably coupled to a second arm of the two-armed guide lever, a second end of the connecting rod being rotatably coupled to a bottom lever arm of the rear folding-top roof part; and a front panel and a rear panel, said rear panel being coupled to a first carrying plate, said first carrying plate including a lever arm which is rotatably coupled to a first end of an intermediate lever, said intermediate lever being mounted rotatably as a rocker about a stationary hinge joint, a second end of the intermediate lever being rotatably coupled to the first end of a link, the second end of the link being coupled to the two-armed guide lever at a distance from said fixed spindle and between said first and second arms, said front panel being coupled to a second carrying plate, said second carrying plate including a lever arm which is rotatably coupled to the first carrying plate via a hinge joint.

10. Covering arrangement according to claim 9, further comprising a supporting lever having a first end rotatably coupled to said lever arm and having a second end rotatably coupled to a stationary hinge joint.

11. Covering arrangement according to claim 9, further comprising a supporting lever having a first end rotatably coupled to said lever arm and having a second end rotatably coupled to a stationary hinge joint.

12. Covering arrangement according to claim 10, further comprising a further supporting lever having a first end rotatably coupled to said lever arm and having a second end rotatably coupled to a stationary hinge joint.

13. Covering arrangement according to claim 9, wherein said front and rear panels cover said folding-top compartment in a substantially horizontal position when the folding top is in a lowered position, said rear panel being moved forward into a substantially vertical position proximate a front edge of said folding-top compartment and said front panel being moved downward into said folding-top compartment when said folding top is being raised and lowered, and said rear panel covers said folding-top compartment in a substantially horizontal position with said front panel remaining in said folding-top compartment when said folding top is in a raised position.

14. Covering arrangement for an opening defined by a front edge of a pivotable folding-top-compartment cover and a rear edge of a rigid panel in a vehicle, comprising:

a front panel;

a rear panel; and means for mounting said front and rear panels such that said front and rear panels are movable between a first position, a second position, and a third position, wherein in said first position, said front and rear panels are located at least approximately in a horizontal plane, with a front edge of said front panel being located adjacent said rear edge of the rigid panel, and with a rear edge of said rear panel being located adjacent said front edge of the pivotable folding-top-compartment cover, wherein in said second position, said rear panel is located at least approximately in a vertical plane proximate said rear edge of the rigid panel, and said front panel is located below said horizontal plane, and wherein in said third position, said rear panel is located at least approximately in said horizontal plane, with a front edge of said rear panel being located adjacent said rear edge of the rigid panel, and said front panel is located below said horizontal plane.

15. Covering arrangement according to claim 14, wherein said means for mounting comprises a bar-type linkage.

16. Covering arrangement according to claim 14, further comprising a folding top which is movable between a covering position covering a passenger compartment of the vehicle and a storage position in a folding top compartment, wherein said front and rear panels are in said first position when said folding top is in said storage position, wherein said front and rear panels are in said third position when said folding top is in said covering position, and wherein said front and rear panels are in said second position when said folding top is being moved between said covering position and said storage position.

* * * * *